United States Patent
Ma et al.

(10) Patent No.: US 12,502,738 B2
(45) Date of Patent: Dec. 23, 2025

(54) METHOD FOR PREPARING PROFILED MICROCHANNEL PLATE HEAT EXCHANGER

(71) Applicant: Xi'an Jiaotong University, Shaanxi (CN)

(72) Inventors: Ting Ma, Shaanxi (CN); Dongjun Xu, Shaanxi (CN); Zhendong Han, Shaanxi (CN); Qiuwang Wang, Shaanxi (CN)

(73) Assignee: Xi'an Jiaotong University, Xi'an (CN)

( * ) Notice: Subject to any disclaimer, the term of this patent is extended or adjusted under 35 U.S.C. 154(b) by 0 days.

(21) Appl. No.: 19/281,459

(22) Filed: Jul. 25, 2025

(65) Prior Publication Data

US 2025/0353123 A1     Nov. 20, 2025

Related U.S. Application Data

(63) Continuation-in-part of application No. 18/789,605, filed on Jul. 30, 2024.

(30) Foreign Application Priority Data

Aug. 25, 2023 (CN) .......................... 202311078473.9

(51) Int. Cl.
*B23P 15/26* (2006.01)

(52) U.S. Cl.
CPC .................................. *B23P 15/26* (2013.01)

(58) Field of Classification Search
CPC . B23P 15/26; B23P 23/00; B23H 7/00; B23K 26/342
See application file for complete search history.

(56) References Cited

U.S. PATENT DOCUMENTS

2022/0373273 A1* 11/2022 Klausner .................. B22F 3/16

* cited by examiner

*Primary Examiner* — Lee A Holly

(57) ABSTRACT

A method for preparing a profiled microchannel plate heat exchanger, and belongs to the technical field of heat exchange. The method based on a combination of a plurality of methods formed by selective laser melting and micro electrical discharge machining can realize a profiled microchannel plate heat exchanger having large aspect ratio flow channels and closed profile section flow channels.

10 Claims, 5 Drawing Sheets

METHOD FOR PREPARING PROFILED MICROCHANNEL PLATE HEAT EXCHANGER

CROSS-REFERENCE TO RELATED APPLICATIONS

This application is a continuation-in-part of U.S. Utility patent application Ser. No. 18/789,605, entitled "Composite Process and System for Preparing Profiled Microchannel Plate Heat Exchanger," filed on Jul. 30, 2024, which claims priority to Chinese Patent Application No. 202311078473.9, filed on Aug. 25, 2023. The above applications are hereby incorporated by reference in their entirety for all purposes.

TECHNICAL FIELD

The present invention belongs to the technical field of heat exchange, and in particular relates to a method for preparing a profiled microchannel plate heat exchanger.

BACKGROUND

Printed Circuit Heat Exchanger (PCHE) is an efficient and compact microchannel plate heat exchanger, and can transfer heat under severe conditions such as high temperature and high pressure. A conventional process for manufacturing a printed circuit heat exchanger is as follows: firstly, open-section flow channels are etched on metal plates by an etching process, and then multiple layers of plates are stacked and welded by vacuum diffusion welding to obtain an integrated heat exchanger core, and finally an inlet and an outlet are connected to heads to obtain the printed circuit heat exchanger. Among them, the etching process is mainly wet chemical etching, the plates are usually made of stainless steel, and flow channel sections are mainly open sections such as semi-circular, airfoil fins and S-shaped fins.

At present, process characteristics of the wet chemical etching restrict flow channel form and material selection of microchannel plate heat exchangers, which in turn limit their high temperature and high pressure performance and reliability. Firstly, since a reaction between an etching solution and a metal to be etched is isotropic, reacting substances can participate in the reaction in any direction, resulting in that a substrate material below a mask material will also be erroneously eroded, resulting in a side etching phenomenon in chemical etching; and second, since a metal surface is gradually passivated as the reaction proceeds, a regeneration rate of the etching solution continuously decreases as an etching depth increases, and decrease in composition consistency results in a regional deviation and an overall decrease in an etching rate. For the above reasons, the wet chemical etching has strict requirements for an aspect ratio (a ratio of a depth to a width of the flow channel section) of the flow channel section, and cannot machine precision flow channels with large aspect ratio sections; the wet chemical etching has low efficiency in the case of materials with strong corrosion resistance such as superalloys, and highly corrosive substances such as hydrochloric acid and nitric acid are generally used, which does not comply with the environmental protection concept of green machining.

In addition, the existing processes can not machine flow channels with closed profile sections such as circular, oval and polygonal sections, which limits pressure bearing performance and compactness of the microchannel plate heat exchangers.

Chinese patent No. CN 104266514 B mentions a method for machining an integral heat exchanger, where wire cutting is used to complete the machining of each layer of channel, and a conventional welding method (electric welding, argon arc welding, etc.) is used to weld and close a cutting line gap of an outer wall surface on each layer. However, only the cutting line gap on the outer surface of the heat exchanger is closed in this method, inner cutting line gaps are still open, and each layer of rib plate is separated from an upper wall surface, resulting in internal substantial intercommunication between the channels of the same layer; and only the outermost layers are substantially connected to each other, and internal solids are not substantially integrated, which greatly increases thermal resistance, and there is still room for improvement in heat exchange efficiency and pressure bearing capacity of the heat exchanger. In addition, a hydraulic diameter of each straight-through channel machined by the method described in the patent is 1-4 mm, and a thickness of a partition wall between the straight-through channels is 1-2 mm. There is still significant room for optimization of characteristic size of the channels and the thickness of the partition wall.

Chinese patent No. CN 105880956 B mentions a microchannel heat exchanger with a porous bottom surface of a micropore structure and a manufacturing method thereof. However, a minimum width of microchannels machined by this method is 0.4 mm, and a minimum spacing between two adjacent microchannels is 0.4 mm, and there is still room for reduction of the two characteristic sizes. Secondly, the heat exchanger prepared by this method cannot withstand high temperature and high pressure.

Chinese patent No. CN 105698563 B mentions a microchannel heat exchanger having a flow dividing-converging structure and a manufacturing method thereof, where the manufacturing method is characterized in that: a metal microchannel substrate is a copper substrate or an aluminum substrate or a stainless steel substrate, and the method can actually not be limited to the machining of the above substrates. For example, the method can be applied to the machining of high temperature alloys, titanium alloys and other materials.

Based on the above analysis, the problems and defects of the prior art are as follows:

1. Inability to achieve large aspect ratio flow channels: traditional processes and manufacturing methods limit the size and shape of flow channels of microchannel plate heat exchangers, and can not achieve large aspect ratio flow channels (i.e., flow channels with a large ratio of flow channel width to length). This results in limited heat exchange area of the heat exchangers, affecting heat exchange efficiency and heat exchange performance.

2. Inability to machine closed profile section flow channels: current machining processes can not effectively machine flow channels with closed profile sections such as circular, elliptical and polygonal sections, resulting in unclosed internal cutting line gaps, resulting in internal substantial intercommunication between channels of different layers, affecting pressure bearing performance and compactness of the heat exchangers.

3. Limited characteristic size and partition wall thickness: there is still room for improvement in the microchannel size and the thickness of the partition wall mentioned in existing patents. The size of the microchannels and the thickness of the partition wall have a great influence on the performance of the heat exchangers. Further reducing the characteristic size and increasing the thickness of the partition wall will help to improve the heat exchange performance of the heat exchangers.

4. Inadequate high temperature and high pressure performance: some heat exchangers of the prior art can not withstand high temperature and high pressure environments, but the ability to withstand high temperature and high pressure environments is necessary in some industrial and energy applications. Therefore, there is a need to develop new microchannel plate heat exchangers to meet heat exchange requirements in high-temperature and high-pressure environments.

Addressing these defects and technical problems requires innovative machining processes and manufacturing methods to achieve further optimization of large aspect ratio flow channels, closed profile section flow channels and microchannel sizes. At the same time, material selection of the heat exchangers needs to be considered to ensure that they can meet the requirements of withstanding high temperature and high pressure environments. The research and development of new profiled microchannel plate heat exchangers will provide a more efficient and reliable solution for heat exchange application in energy, petrochemical, aerospace and other fields.

SUMMARY

In view of the problems of the prior art, the present invention provides a method for preparing a profiled microchannel plate heat exchanger.

The present invention is realized as follows: provided is a method for preparing a profiled microchannel plate heat exchanger, which realizes efficient preparation of the profiled microchannel plate heat exchanger by combining a plurality of advanced machining techniques such as selective laser melting, wire cut electrical discharge machining, grinding, micro electrical discharge machining and vacuum diffusion welding. Here, metal substrates printed by the selective laser melting has high design freedom; the wire cut electrical discharge machining can retain a grinding tolerance for upper and lower surfaces of plates to ensure subsequent grinding accuracy; the micro electrical discharge machining can achieve machining of complex micro flow channel structures; and the vacuum diffusion welding can ensure the quality of bonding between multiple layers of plates. Therefore, such a preparation solution can bring innovation and progress to the manufacturing of heat exchangers.

The method specifically includes the following machining steps:

Step S101, performing slicing on a three-dimensional (3D) digital model of the profiled microchannel plate heat exchanger, and melting raw material powder layer by layer with a laser beam according to information of slices obtained by layering to obtain a multi-layer metal substrate; the multi-layer metal substrate including an array of hollow flow channels having a closed profile section and a lug portion; where the multi-layer metal substrate is printed layer by layer in a direction vertical to a core straight tube segment to prevent slag hanging from blocking the microchannels. Here, when the 3D digital model is sliced to obtain the information of each slice, it is necessary to consider the subsequent cutting and grinding tolerance, that is, a certain tolerance is reserved for each slice during slicing.

Step S102, cleaning off powder from the multi-layer metal substrate obtained in step S101, and then cutting the multi-layer metal substrate into a plurality of single-layer metal plates, with a grinding tolerance of 0.1-1 mm left on upper and lower surfaces of each of the single-layer metal plates during cutting.

Step S103, fastening and connecting countersunk holes of the lug portions of the metal plates obtained in step S102 to a grinding machine by bolts to grind the upper and lower surfaces of the metal plates.

Step S104, making flow channels on the metal plates obtained in step S103 using array line electrode wires, with at least one of the flow channels having a large aspect ratio section and formed by cutting with the array line electrode wires; where the array line electrode wires are arranged at intervals, are X in number and are divided into Y groups, and the flow channels are made by X/Y downward pressings.

Step S105, removing a surface oxide layer and surface oil stains from the metal plate obtained in step S104, and cleaning and drying the metal plates; then sequentially compacting the metal plates layer by layer, fixing the plurality of the metal plates by the lug portions, then welding the plurality of the metal plates by vacuum diffusion welding, and finally cutting away the lug portions to obtain a profiled microchannel plate heat exchanger core.

Further, in S101, in order to prevent deformation of the single-layer substrate during printing, a method of stacking and printing multiple layers of substrate is used, and in order to prevent slag hanging in horizontal printing from blocking microchannels, the printing proceeds vertically along a core straight tube segment.

Further, in S101, before printing, metal powder with a particle size of 5-35 um is used, argon gas is used as a protective gas to heat up to 60° C.; and after printing, high pressure air and high pressure deionized water are used to clean off the powder from the hollow flow channels inside a test piece.

Further, in S104, the array line electrode wires are provided with X large aspect ratio section flow channels which are divided into Y groups, so there are Y electrodes; and the electrode wires of the electrodes are arranged spaced, and an array of the large aspect ratio section flow channels on the single-layer metal plate requires X/Y downward pressings of the array electrode.

Further, a minimum characteristic size of the closed profile is not less than 0.1 mm, and a thickness of the single-layer heat exchange plate is not less than 0.3 mm.

Further, the method of the present invention allows machining of channels of any section, including profiled section channels.

Further, the method of the present invention allows machining of hollow closed profile section flow channels, including profiled section flow channels.

Further, the channels machined by the method of the present invention has the flow channels of the same layer and the flow channels of different layers independent and isolated from each other, so there is no intra-layer flow and interlayer flow.

Another object of the present invention is to provide an implementation of a composite process for preparing a profiled microchannel plate heat exchanger:

1. Selective laser melting method (S101): First, a metal substrate is printed using Selective Laser Melting (SLM) method. This is an additive manufacturing (3D printing) method that uses a laser beam to scan over a metal powder layer along a predetermined path to melt and solidify metal powder to form a predetermined pattern. By repeating this process, it is possible to print out metal substrates with high design freedom, especially heat exchanger channels with large depth-to-diameter ratios and large aspect ratios.

2. Wire cut electrical discharge machining (S102): then, the multi-layer metal substrate is cut into single-layer metal plates by wire cut electrical discharge machining. The wire cut electrical discharge machining is a method of cutting using high temperature electrical discharge occurring between electrode wires. This process can retain grinding tolerance of upper and lower surfaces of the plates to ensure accuracy of subsequent grinding.

3. Grinding (S103): next, the upper and lower surfaces of the single-layer metal plates are subject to grinding to make the surfaces smooth, flat and have an accurate thickness. This involves the use of a grinder or other similar tool.

4. Micro electrical discharge machining (S104): then, a complex flow channel structure is made on the ground metal plate by the micro electrical discharge machining as a channel. This involves the use of a micro electrical discharge machine which can cause micro electrical discharge on metal surfaces to form complex flow channels/channels by etching the metal surfaces.

5. Vacuum diffusion welding (S105): finally, a plurality of metal plates are welded together by vacuum diffusion welding. The vacuum diffusion welding is a welding method performed under vacuum conditions, and can realize connection between multiple layers of metal plates, making them integrated.

The above is an implementation of preparing the profiled microchannel plate heat exchanger by this composite process. The specific implementation needs to be adjusted according to actual design requirements and equipment conditions.

In combination with the technical solution and the technical problems solved as described above, the claimed technical solution of the present invention has the following advantages and positive effects:

Firstly, the composite process for preparing the profiled microchannel plate heat exchanger according to the present invention achieves a profiled microchannel plate heat exchanger with large aspect ratio flow channels and closed profile section flow channels. Significant technical advances have been made in each step in the composite process for preparing the profiled microchannel plate heat exchanger.

The following are specific technical advances for each step:

1. Machining step S101: printing the metal substrate by the selective laser melting method.

Significant technical advances: The selective laser melting method is a fast machining technique that makes it possible to print out complex profiled microchannel plate heat exchanger metal substrates from the metal powder according to designed structural data. Compared with traditional machining, the selective laser melting has the following advantages: more tolerant material selectivity, higher production efficiency and greater design freedom; compared with two-dimensional machining of etching process, the selective laser melting can produce more complex and precise structures in three-dimensional spaces; and compared with traditional subtractive manufacturing, the selective laser melting is not limited to cutting performance of materials and can machine a wider range of materials, the depth-to-diameter ratio of machined micropores can break through 100:1, powder materials can be recycled and sieved for reuse, thereby saving a large amount of materials.

2. Machining step S102: cutting the multi-layer metal substrate into single-layer plates by the wire cut electrical discharge machining.

Significant technical advances: the wire cut electrical discharge machining can cut the multi-layer metal substrate into single-layer plates with high precision without physical deformation or mechanical stress, ensuring that the machined plates will maintain highly accurate size and flatness. This is crucial for the preparation of thin plate materials for microchannel plate heat exchangers, and traditional mechanical cutting leads to large deformation and dimensional errors.

3. Machining step S103: grinding of the single-layer plates.

Significant technical advances: the single-layer metal plates are ground by the precision grinding machine, which can ensure that the surfaces are smooth and flat and maintain the accurate thickness required by the design. This grinding machining method is more accurate than traditional mechanical grinding, and can achieve micron-scale dimensional accuracy, thereby ensuring heat exchange performance and sealing performance of the heat exchanger.

4. Machining step S104: forming the large aspect ratio section flow channels by micro electrical discharge machining.

Significant technical advances: the micro electrical discharge machining enables the making of complex microchannel structures on the surfaces of the metal plates and allows the complex microchannel structures as channels of heat exchangers, including the large aspect ratio section flow channels. This enables the heat exchanger to achieve higher heat transfer efficiency and a larger surface area in a limited space, thereby improving performance of the heat exchanger. In the present invention, the flow channel and the channel refer to the same structure.

5. Machining step S105: efficient cleaning and welding process.

Significant technical advances: weakly acidic and organic solvents are used in the cleaning process to effectively remove the oxidation layers and oil stains on the metal surfaces to ensure quality of welded joints. Welding is carried out by the vacuum diffusion welding, which is a filler metal-free welding method under high temperature and high vacuum, capable of avoiding contamination by gas and impurities during the welding process, which ensures strength and tightness of the welded joints.

The method for preparing the profiled microchannel plate heat exchanger of the present invention combines such methods as selective laser melting, wire cut electrical discharge machining, grinding, micro electrical discharge machining, cleaning and high-temperature vacuum welding and the like, which significantly improves precision, efficiency and performance of the preparation process and realizes the manufacturing of the profiled microchannel plate heat exchanger.

Secondly, considering the technical solution as a whole or from the perspective of products, the technical effects and advantages of the claimed technical solution of the present invention are specifically described as follows:

1. Channels of any section may be machined, including but not limited to circular, rectangular and other profiled section channels.

2. Hollow closed profile section flow channels can be machined, including and not limited to micro circular hole, micro square hole and other profiled section channels.

3. High-precision machining of microchannels with any aspect ratio can be achieved, including but not limited to micro rectangular and other profiled section channels.

4. Characteristic theoretical aspect ratios of the flow channels manufactured by the process have no range constraint, a minimum characteristic size of the closed profile is not less than 0.1 mm, and the thickness of the single-layer heat exchange plate is not less than 0.3 mm, and limit sizes of the manufactured microchannels are greatly reduced.

5. The vast majority of metallic materials can be machined, including but not limited to superalloys, titanium alloys, aluminum alloys, and the like.

6. The use of array line electrodes arranged spaced can effectively improve machining quality and efficiency of microchannel arrays.

7. Whether circular or rectangular channels, the flow channels of the same layer and the flow channels of different layers are independent and isolated from each other, and there is no intra-layer flow and inter-layer flow. The vacuum diffusion welding is used between the plates to achieve atomic level diffusion bonding, which effectively improves the heat exchange efficiency and pressure resistance.

8. Compared with general microchannel heat exchangers, the microchannel heat exchanger according to the present invention can withstand extreme high temperature and high pressure conditions.

9. The technical solution is more environmentally friendly and free of contamination.

Thirdly, the expected profit and commercial value of transforming the technical solution of the present invention are as follows: the profiled microchannel plate heat exchangers can be efficiently machined and manufactured, which improves technology readiness level and promotes low-carbon, green, and environmentally friendly development of the industry. At the same time, additive manufacturing and electro-machining belong to high-end advanced manufacturing, and this technical solution is beneficial to promote the application and development of high-end advanced manufacturing. Compared to conventional chemical etching process for microchannel plate heat exchangers such as printed circuit heat exchangers, channels with any aspect ratio section shapes as well as large aspect ratio channels can be machined.

DESCRIPTION OF THE EMBODIMENTS

In order to make the objects, technical solution and advantages of the present invention more clear, the present invention will be further described in detail below in conjunction with embodiments. It should be understood that the specific embodiments described herein are merely illustrative of the present invention and are not intended to limit the present invention.

An embodiment of the present invention provides a method for preparing a profiled microchannel plate heat exchanger, where profiled channels refer to internal flow channels of the heat exchanger having large aspect ratio section shapes such as rectangular, rounded rectangular, semi-circular sections as well as closed profile shapes such as circular, oval and polygonal profiles, including but not limited to flow channels having a combination of the sections of the above shapes.

Figure 1:
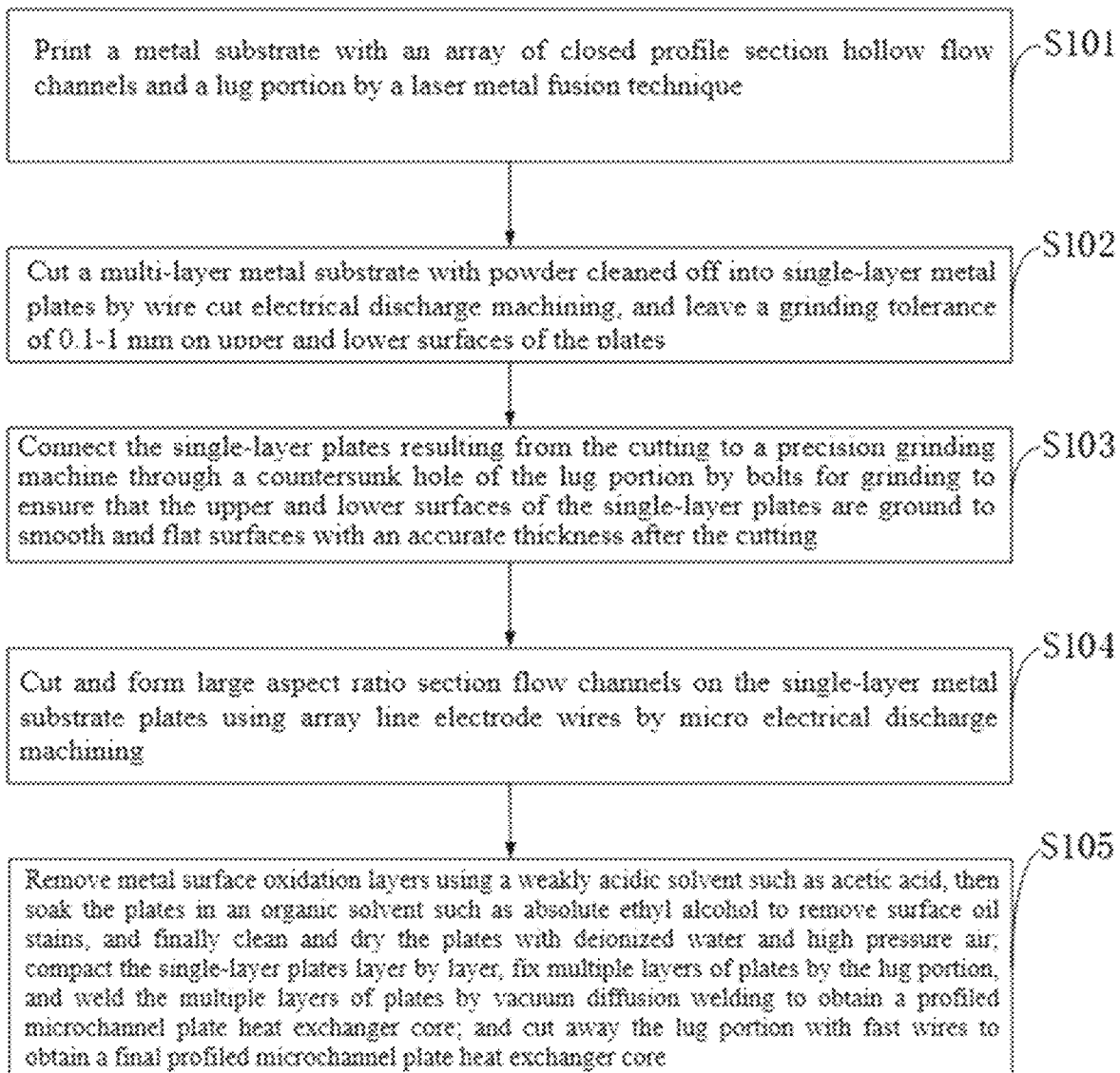
FIG. 1 is a flow diagram of a composite process for preparing a profiled microchannel plate heat exchanger according to an embodiment of the present invention.
Figure 5:
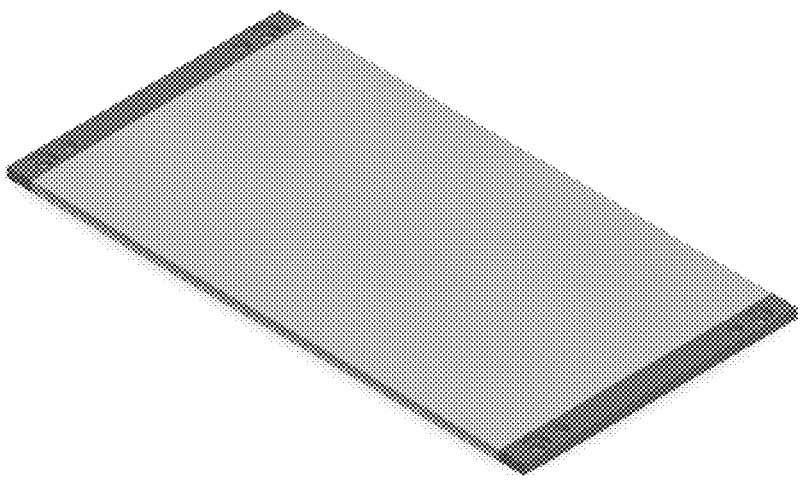
FIG. 5 is a schematic diagram of a single-layer metal substrate plate after grinding of upper and lower surfaces according to an embodiment of the present invention.
Figure 8:
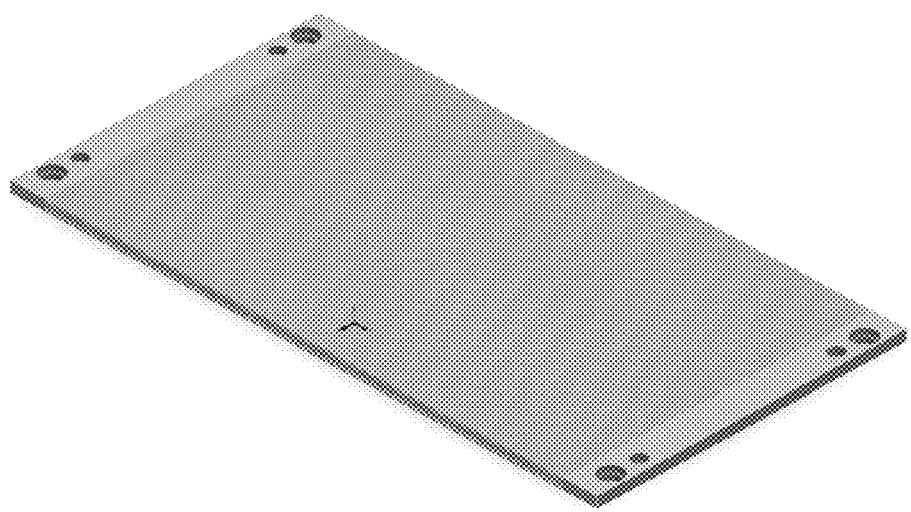
FIG. 8 is a schematic diagram of a plate of a profiled microchannel plate heat exchanger prepared by a composite process according to an embodiment of the present invention.
Figure 9:
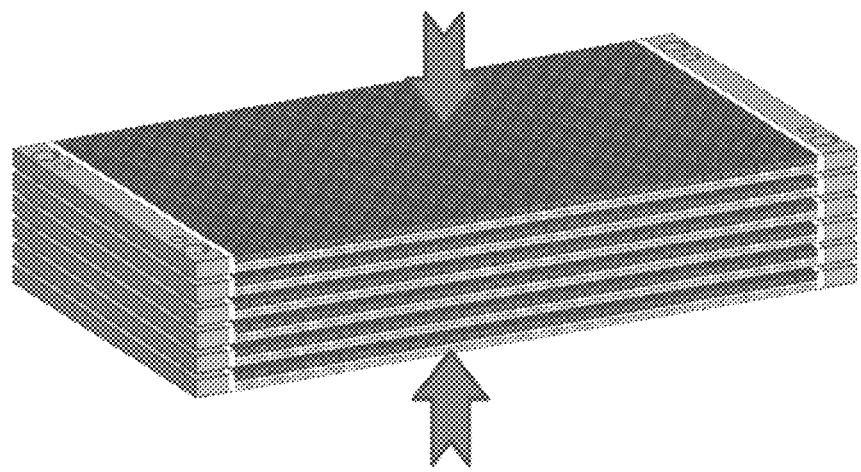
FIG. 9 is a schematic diagram of diffusion welding with a lug portion uncut according to an embodiment of the present invention.

As shown in FIG. 1, an embodiment of the present invention provides a method for preparing a profiled microchannel plate heat exchanger, including the following machining steps:

Step S101, performing slicing on a three-dimensional (3D) digital model of a profiled microchannel plate heat exchanger to be machined to obtain several slices, and melting raw material powder layer by layer with a laser beam according to information and parameters of the obtained slices to obtain a multi-layer metal substrate; the multi-layer metal substrate including an array of hollow flow channels having a closed profile section and a lug portion. Here, the 3D digital model is defined by the structure and size of the heat exchanger to be machined, and slicing the 3D digital model is a common way in additive manufacturing, such as a method for manufacturing three-dimensional objects by additive manufacturing described in US20190217543A1. The array of hollow flow channels is used as channels (flow channels) of the plate heat exchanger, and the lug portion is a temporary portion (also referred to as a locking head or welding lug) formed at corresponding positions on each slice during slicing for subsequent grinding and vacuum welding. As shown in FIGS. 5 and 8 to 9, the lug portion is an end piece formed at both ends of the metal plate and is provided with a corresponding through hole thereon for fixing.

Step S102, cutting the multi-layer metal substrate with powder cleaned off into several single-layer metal plates by Wire cut Electrical Discharge Machining (WEDM), and reserving a grinding tolerance of 0.1-1 mm on upper and lower surfaces of each of the single-layer metal plates during machining. Here, WEDM is also known methods, for example, as described in US20160121415A1.

Step S103, fastening and connecting the single-layer metal plates resulting from the machining to a precision grinding machine through countersunk holes of the lug portion by bolts for grinding the upper and lower surfaces of the single-layer metal plates to ensure that the upper and lower surfaces of the single-layer plates are ground to smooth and flat surfaces with an accurate thickness after the machining. Here, the lug portion is a convex piece formed on each slice (i.e., each metal plate), and each metal plate can be fixed to a precision grinding machine by bolting through the countersunk holes (i.e., through holes) located thereon.

Step S104: performing cutting with array line electrode wires on the single-layer metal substrate plates resulting from step S103 by micro electrical discharge machining to obtain at least one flow channel with a large aspect ratio section.

Step S105, removing surface oxidation layers from the metal plates with a weakly acidic solvent such as acetic acid, then soaking the metal plates in an organic solvent such as absolute ethyl alcohol to remove surface oil stains, and finally cleaning and drying the metal plates with deionized water and high pressure air; compacting several single-layer plates layer by layer, fixing the plurality of metal plates through the lug portions, and welding the metal plates by vacuum diffusion welding to obtain a crude profiled microchannel plate heat exchanger core; and cutting away the lug portions by High-Speed Wire cut Electrical Discharge Machining (WEDM-HS) to obtain a final profiled microchannel plate heat exchanger core. Here, the lug portions are used temporarily during machining for fixing or positioning the metal plates when needed, and are cut away after the manufacture of the heat exchanger core is completed.

Figure 2:
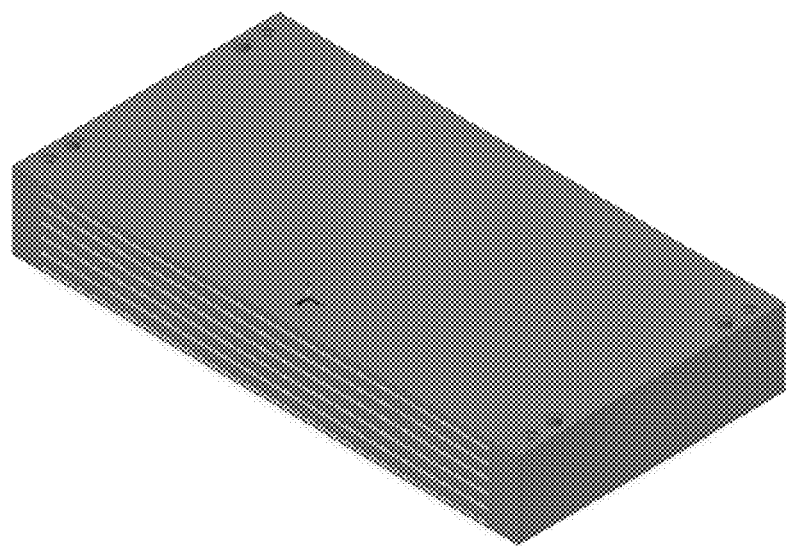
FIG. 2 is a structural schematic diagram of a multi-layer metal substrate structure according to an embodiment of the present invention.

In Step S101, in order to prevent deformation of the metal substrate during printing, a method of stacking and printing multiple layers of metal substrate is used, and the multi-layer metal substrate is as shown in FIG. 2; in order to prevent slag hanging in horizontal printing from blocking microchannels, the printing proceeds vertically along a core straight tube segment; and before printing, metal powder with a particle size of 5-35 um is used as the raw material powder, and argon gas is used as a protective gas to heat up to 60° C. Here, in step S101, Selective Laser Melting (SLM) is used for layer-by-layer printing to obtain the multi-layer metal substrate; the printing proceeds vertically along the core straight tube segment, which means that a core flow channel of the heat exchanger (in addition to the core flow channel, the heat exchanger also has non-core flow channels such as an inlet and an outlet) is perpendicular to the horizontally printed substrate instead of being parallel to the horizontal substrate, so as to prevent the powder from blocking the micro flow channels due to slag hanging under gravity during the printing process.

Figure 3:
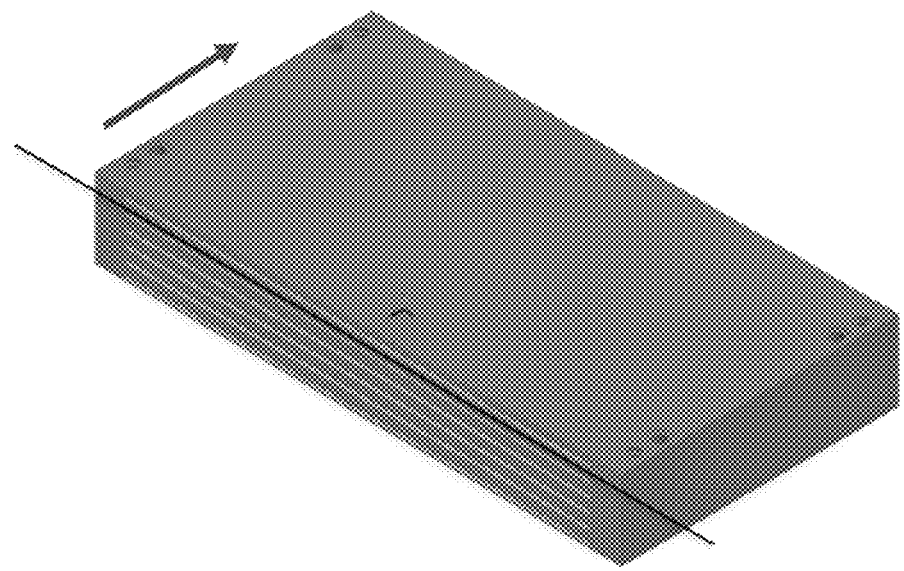
FIG. 3 is a schematic diagram of wire cut electrical discharge machining of a multi-layer metal substrate according to an embodiment of the present invention.
Figure 4:
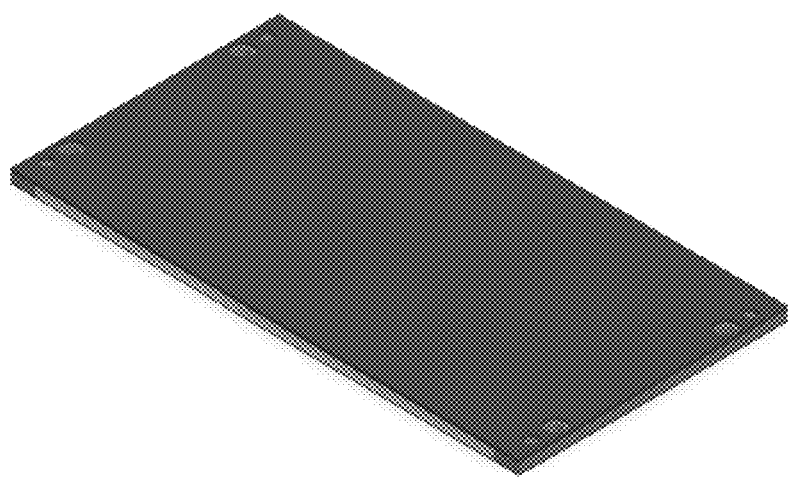
FIG. 4 is a schematic diagram of a single-layer metal substrate plate after cutting according to an embodiment of the present invention.

In step S102, after the printing is completed in step S101, high pressure air and high pressure deionized water are used to clean off the powder from the hollow flow channels inside the test piece (i.e., the multi-layer metal substrate printed layer by layer). As shown in FIG. 3, the multi-layer metal substrate is cut into a plurality of single-layer metal plates using the electrode wires; and the single-layer metal plate resulting from the cutting is as shown in FIG. 4.

In Step S103, as shown in FIG. 5, the upper and lower surfaces of the single-layer metal plates are ground to smooth and flat surfaces with an accurate thickness.

Figure 6:
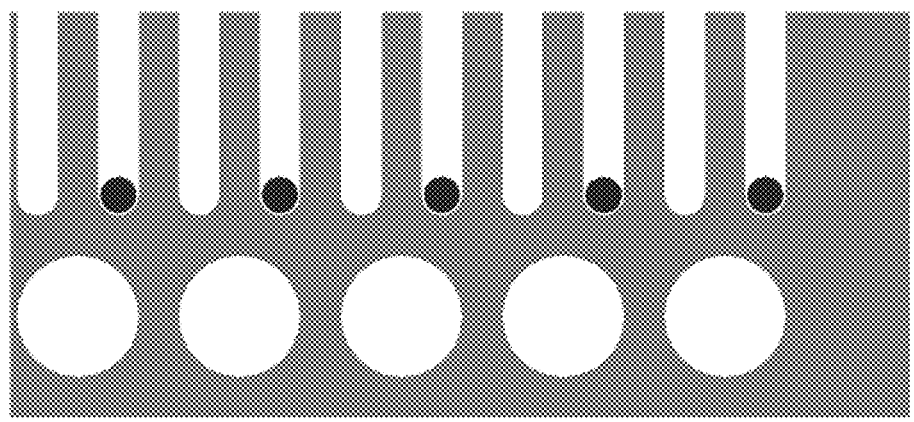
FIG. 6 is a schematic diagram of alternate arrangement of electrode wires of an array electrode according to an embodiment of the present invention.
Figure 7:
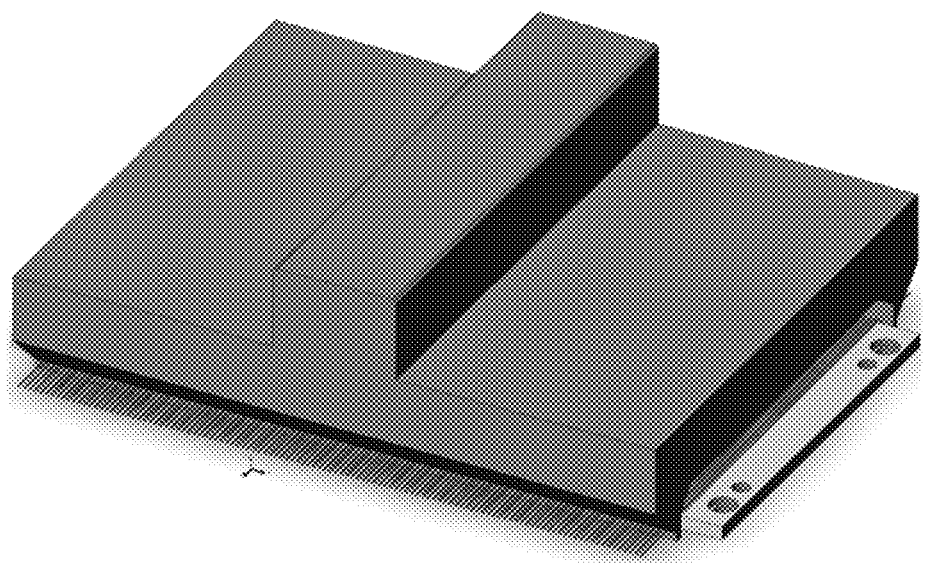
FIG. 7 is a schematic diagram of an overall structure of an array electrode according to an embodiment of the present invention.

In S104, the array line electrode wires are characterized in that: in order to reduce interaction between electrodes during machining, X large aspect ratio section flow channels are provided and divided into Y groups, so there are Y electrodes; and the electrode wires of the electrodes are arranged alternately, and an array of the large aspect ratio section flow channels on the single-layer metal substrate plate requires X/Y downward pressings of the array electrode. A schematic diagram of the alternate arrangement of the electrode wires of the array electrode is as shown in FIG. 6, a schematic diagram of an overall structure of the array electrode is as shown in FIG. 7, and the plates of the prepared profiled microchannel plate heat exchanger are as shown in FIG. 8. Advantages of this step: both quality of inner surfaces of the flow channels and machining efficiency are balanced, which facilitates removal of ablation products, and improves machining stability and machining quality.

Figure 10:
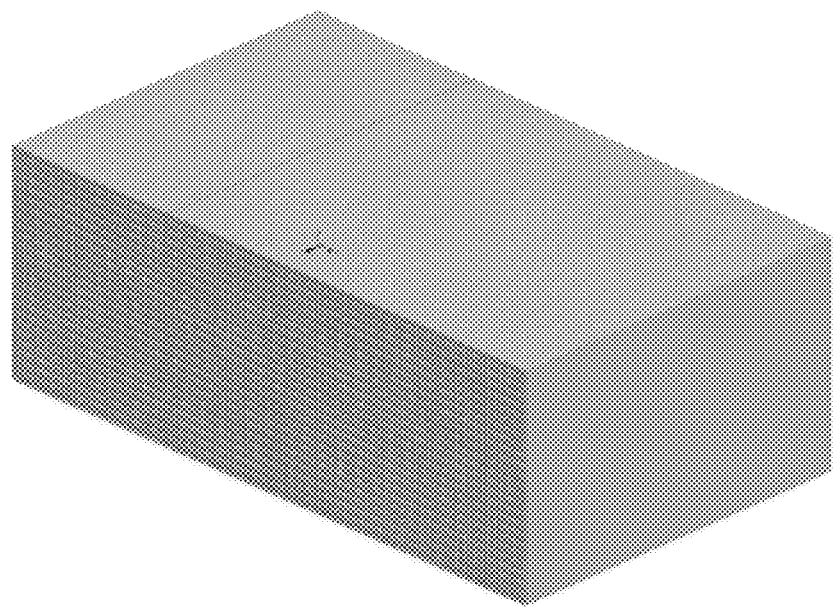
FIG. 10 is a schematic diagram of a profiled microchannel plate heat exchanger core with a lug portion cut according to an embodiment of the present invention.

In step S105, as shown in FIG. 9, the vacuum diffusion welding is used to obtain the profiled microchannel plate heat exchanger core; and as shown in FIG. 10, fast wires are used to cut away the lug portions to obtain the final profiled microchannel plate heat exchanger core.

Preferably, in the present invention, a minimum characteristic size of the closed profile is not less than 0.1 mm, and a thickness of the single-layer heat exchanger plates (the heat exchanger plates prepared in step S104) is not less than 0.3 mm.

Process parameters of the selective laser melting method are as follows: a spot diameter is 20-80 um, a laser power is 50-200 w, a scanning speed is 500-1500 mm/s, a scanning pitch is 0.05-0.1 mm, strip scanning is used, and a lamination thickness is 10-50 um.

Process parameters of the micro electrical discharge machining method are as follows: the electrode wires are molybdenum wires with a diameter of 0.1 mm, a machining current is 1-3 A, a pulse width is 1-5 us, and line electrode wire speed is 1-4 mm/s.

The flow channels with the closed profile section are micro circular channels, and the flow channels with a large aspect ratio profile section are micro square channels with rounded corners, a hydraulic diameter of the micro circular channels is not less than 0.1 mm, the aspect ratio of the micro square channels is not more than 100, and a solid thickness between the channels is not less than 0.1 mm.

Upper and lower surface roughness after grinding of the plates is not higher than Ra0.4 um.

Due to small diameter (micron scale), large number and long flow length of printed circuit plate heat exchanger channels, circular microchannels have a great depth-to-diameter ratio, and belong to the category of micropores which are very difficult to be machined by traditional processes. Moreover, due to the large number of channels, the machining efficiency must be considered. Although micropore machines can meet dimensional requirements for machining, their efficiency is very low, and they have no practical engineering application value.

The SLM process has unique advantages in manufacturing heat exchangers with complex hollow structures, is applicable to materials of any material properties, and can machine corrosion-resistant and hard-to-cut materials, such as superalloys. Therefore, the SLM process is selected to manufacture hollow flow channel members with closed profile sections.

Because the superalloys are hard-to-cut metals with high hardness, high viscosity and high cutting difficulty, and thin-wall array structures can not be machined by the traditional machining, the wire cut electrical discharge machining with less residual stress and high machining efficiency are considered to machine the large aspect ratio flow channels.

As an optimization of an embodiment of the present invention, in step S102, the electrode wires are used to cut the multi-layer metal substrate. The electrode wires are usually used for wire cut electrical discharge machining, which is a cutting method that uses high temperature generated by electrical discharge to cut metals. The electrode wires are usually made of copper, tungsten or other conductive materials. During cutting, electrical discharge occurs between the electrode wires and a workpiece, and the electrical discharge will melt and evaporate a portion of a surface of the workpiece, thereby achieving the purpose of cutting. The schematic diagram as shown in FIG. 3 shows a position of the electrode wires during cutting and an area at which the electrical discharge occurs. The single-layer metal substrate plate resulting from the cutting is as shown in FIG. 4.

As an optimization of an embodiment of the present invention, step S103 involves grinding the upper and lower surfaces of the single-layer metal plates resulting from the cutting to make them smooth and flat. This process generally involves removing rough portions of the metal surface by physical abrasion using tools such as grinders or grinding wheels to achieve a smooth effect. This process also ensures accurate thickness of the plates. FIG. 5 shows a comparison of the metal plates before and after grinding.

As an optimization of an embodiment of the present invention, in step S104, characteristics and arrangement of the array electrode wires are described in detail. To reduce the interaction between the electrodes, X large aspect ratio section flow channels are provided and divided into Y groups. This means that there are X/Y flow channels in each group, while the number of electrodes is Y. On the single-layer metal substrate plates, an array of flow channels requires X/Y downward pressings of the array electrode. FIG. 6 shows the arrangement of electrode wires, while FIG. 7 shows an overall structure of the array electrode. Finally, by this method, the profiled microchannel plate heat exchanger plates as shown in FIG. 8 can be prepared.

As an optimization of an embodiment of the present invention, in step S105, the profiled microchannel plate heat exchanger core is obtained by the vacuum diffusion welding. The vacuum diffusion welding is a welding method performed under vacuum conditions, which uses diffusion between metal atoms to achieve welding. This method can achieve tight connection of metals without any welding flux. Then, as shown in FIG. 10, fast wires are used to cut away the lug portions to obtain the final profiled microchannel plate heat exchanger core. This step involves the use of a fast wire cut electrical discharge machine to perform precise cutting at specific locations on the metal plates to remove unwanted portions to achieve the final shape and size.

The composite process for preparing the profiled microchannel plate heat exchanger according to the embodiment of the present invention has the following characteristics:

1. Channels of any section may be machined, including but not limited to circular, rectangular and other profiled section channels.

2. Hollow closed profile section flow channels can be machined, including and not limited to micro circular hole, micro square hole and other profiled section channels.

3. High-precision machining of microchannels with any aspect ratio can be achieved, including but not limited to micro rectangular and other profiled section channels.

4. Characteristic theoretical aspect ratios of the flow channels manufactured by the process have no range constraint, a minimum characteristic size of the closed profile is not less than 0.1 mm, and the thickness of the single-layer heat exchange plate is not less than 0.3 mm, and limit sizes of the manufactured microchannels are greatly reduced.

5. The vast majority of metallic materials can be machined, including but not limited to superalloys, titanium alloys, aluminum alloys, and the like.

6. The use of array line electrodes arranged spaced effectively improves machining quality and efficiency of microchannel arrays.

7. Whether circular or rectangular channels, the flow channels of the same layer and the flow channels of different layers are independent and isolated from each other, and there is no intra-layer flow and inter-layer flow. The plates are welded together by vacuum diffusion welding, which effectively improves the heat exchange efficiency and pressure resistance.

8. Compared with general microchannel heat exchangers, the microchannel heat exchanger according to the present invention can withstand extreme high temperature and high pressure conditions.

9. The composite process is more environmentally friendly and free of contamination.

The composite process for preparing the profiled microchannel plate heat exchanger according to an embodiment of the present invention is a composite technique process route based on a combination of a plurality of processes formed by selective laser melting (one of additive manufacturing method) and micro electrical discharge machining, which is referred to as an SED technique process route. A main machining path of the process route is that the circular channels of the cold side of the profiled microchannel precooling heat exchanger are integrally formed by the SLM additive manufacturing technique, and then the square channels of the hot side are formed by the electrical discharge machining (EDM) and ablation on the integrally formed core plate, and finally the core plate is smoothed, and then various layers of core plates are combined and spliced by diffusion welding to form a final profiled microchannel precooling heat exchanger principle prototype. Specific machining parameters and machining processes involved in the SED technique process route are described in detail below.

1. Firstly, the SLM additive manufacturing technique was used to machine a substrate with a core plate having a 0.6 mm diameter circular channel array structure and a countersunk hole (the countersunk hole here was not related to the structure of the principle prototype and was only used as a means for fastening and positioning in subsequent machining, without precision requirements for the aperture), a size of the resulting single-layer substrate plate was 373 mm×24 mm×1.75 mm (including edge size), GH4169 powder with a particle size of 5-35 um was selected as the forming powder, and a diameter of a customized micro spot was 60 um; in addition, in order to prevent deformation and warping during machining due to printing only a single-layer substrate (with a thickness of about 1.75 mm), which may affect flatness of subsequent core plates, a machining method of stacking and printing multiple layers of substrate plates was used, and each stacked substrate consisted of 5 single-layer plates with a thickness of about 8.75 mm. During printing, since the microchannel had the diameter of 0.6 mm, in order to prevent slag blockage caused by printing in the direction of the core flow channel, the printing proceeded vertically along a core straight tube segment perpendicular to the direction of the flow channel, and a multi-layer substrate model containing the printed micro circular channels and a machined test piece are as shown in FIG. 2.

2. After a surface of the stacked substrate core printed above was simply cleaned, cutting was performed using fast wires (molybdenum wires with a wire diameter of 0.18 mm). As shown in FIG. 3, the substrate containing 5 layers of plates was cut into single-layer plates with a thickness of 2.0 mm, and a grinding tolerance of 0.2 mm was left on upper and lower surfaces of each layer of core plate during cutting. A single-layer substrate plate model resulting from the cutting and the machined test piece are as shown in FIG. 4.

3. The single-layer plates resulting from the cutting were placed in an ethanol solution for ultrasonic cleaning to remove impurities and dirt generated during cutting from the surface, and then the countersunk hole printed in the above process was connected to a precision grinding machine by corresponding matching bolts for grinding. As shown in FIG. 5, it was ensured that the upper and lower surfaces of the single-layer plates resulting from the cutting were ground to smooth and flat surfaces with an accurate thickness.

4. The ground single-layer substrate plates were aligned at specified positions, and before electrode ablation, thin-wall micro fins were machined on a high-temperature side of the substrate plate by wire cut electrical discharge machining. In addition, since thin-wall microchannels were arranged in an array with a small channel spacing of only 0.2 mm, a plurality of electrodes needed to be pressed down in parallel to perform ablation. In order to minimize interaction between adjacent electrodes during machining, the electrode wires of the electrode were arranged spaced, as shown in FIG. 6. An array of molybdenum wires with a diameter of 0.1 mm was used as a working electrode, and the electrode structure is as shown in FIG. 7, a machining short-circuit current was 1 A, a pulse width was 6 us, and an open circuit voltage was 150 V. All square fin structures on a single substrate plate required two downward pressings of the electrode, which took into account quality of the thin wall and channel efficiency, facilitated removal of ablation products, and improved machining stability. FIG. 8 is a schematic diagram of a model of a process test piece obtained by wire cut electrical discharge machine, which was finally formed as the machined test piece resulting from the wire electrical discharge machining. Rectangular microchannels with a width of 0.2 mm, a height of 1 mm and a spacing of 0.2 mm were cut on the GH4169 plates.

5. The single-layer substrate plates resulting from the wire cut electrical discharge machining were subject to ultrasonic cleaning. Since the above-mentioned process mainly used additives and subtractives to machine the test piece; after completion of the machining, due to small microchannels, some residues or debris from the machining were trapped in the small flow channels, the plates were sealed with plastic film for welding after the completion of the cleaning; and during welding, the machined plates were stacked layer by layer in advance and compacted, temperature and pressure were adjusted to combine the plates by diffusion welding for forming, and finally the fast wires were used to cut away the initial process countersunk head end from the resulting test piece to obtain the final profiled channel printed circuit plate heat exchanger core.

TABLE 1

Test items, method and conclusion of core fin

| Test item | Test method | Metering environment | Technical requirements | Measured value | Conclusion |
|---|---|---|---|---|---|
| Part thickness | Micrometer | 20 ± 2° C./40% | 2.01-2.05 mm | 2.012-2.041 mm | Pass |
| Surface roughness | Roughness tester | 20 ± 2° C./40% | Ra0.8 um | Ra0.204-Ra0.561 um | Pass |
| Parallelism | Dial gauge | 20 ± 2° C./40% | 0.01/100 mm | 0.001/100-0.009/100 mm | Pass |
| Groove depth | Universal tool microscope | 20 ± 2° C./40% | 1 ± 0.02 mm | 0.9819-1.0191 mm | Pass |
| Groove width | Universal tool microscope | 20 ± 2° C./40% | 0.2 ± 0.01 mm | 0.200-0.207 mm | Pass |
| Machining deformation | Dial gauge | 20 ± 2° C./40% | 0.01/100 mm | 0.005/100-0.010/100 mm | Pass |
| Surface integrity | 50X magnifier | 20 ± 2° C./40% | No scratch or scoring on the surface | No scratch or scoring is seen | Pass |
| Excess material in the flow channel | 0.7 MPa air press and filter paper | 20 ± 2° C./40% | Internal flow channels are clean and free of blockage | No excess material is seen | Pass |

Some of measured data for the present invention during development is shown in Table 2.

TABLE 2

Some of measured data during development

| Test piece | Part thickness (mm) | Surface roughness | Parallelism | Groove depth | Groove width | Machining deformation | Surface integrity | Excess material |
|---|---|---|---|---|---|---|---|---|
| No. 1 fin | 2.028 | Ra0.4 um | 0.01/100 mm | 1.01 mm | 0.205 mm | 0.005/100 mm | No scratch or scoring on the surface | Internal flow channels are clean and free of blockage |
| No. 2 fin | 2.025 | | 0.01/100 mm | 0.99 mm | 0.200 mm | 0.007/100 mm | No scratch or scoring on the surface | Internal flow channels are clean and free of blockage |
| No. 3 fin | 2.021 | Ra0.4 um | | 1.02 mm | 0.203 mm | 0.007/100 mm | No scratch or scoring on the surface | Internal flow channels are clean and free of blockage |
| No. 4 fin | 2.031 | Ra0.4 um | 0.01/100 mm | 1.01 mm | 0.202 mm | 0.010/100 mm | No scratch or scoring on the surface | Internal flow channels are clean and free of blockage |

TABLE 2-continued

Some of measured data during development

| Test piece | Part thickness (mm) | Surface roughness | Parallelism | Groove depth | Groove width | Machining deformation | Surface integrity | Excess material |
|---|---|---|---|---|---|---|---|---|
| No. 5 fin | 2.027 | Ra0.4 um | 0.01/100 mm | 1.00 mm | 0.201 mm | 0.008/100 mm | No scratch or scoring on the surface | Internal flow channels are clean and free of blockage |
| No. 6 fin | 2.024 | Ra0.3 um | 0.01/100 mm | 1.01 mm | 0.200 mm | 0.006/100 mm | No scratch or scoring on the surface | Interval flow channels are clear and free of blockage |
| No. 7 fin | 2.027 | Ra0.3 um | 0.01/100 mm | 0.98 mm | 0.201 mm | 0.005/100 mm | No scratch or scoring on the surface | Internal flow channels are clean and free of blockage |
| No. 8 fin | 2.033 | Ra0.4 um | 0.01/100 mm | 0.99 mm | 0.200 mm | 0.007/100 mm | No scratch or scoring on the surface | Internal flow channels are clean and free of blockage |
| No. 9 fin | 2.022 | Ra0.3 um | 0.01/100 mm | 1.00 mm | 0.204 mm | 0.005/100 mm | No scratch or scoring on the surface | Internal dow channels are clear and free of blockage |
| No. 10 fin | 2.035 | Ra0.4 um | 0.01/100 mm | 1.01 mm | 0.203 mm | 0.007/100 mm | No scratch or scoring on the surface | Internal flow channels are clean and free of blockage |

A total of 100 fins prepared were measured for fin thickness, flow channel depth and width using a micrometer and a universal tool microscope, and found that the process stability was excellent, and the aspect ratio of the flow channels reached 5:1.

A CNC scanner was used to measure diameter of circular section channels, the diameter of the circular hole was found to be 0.2-0.214 mm, a total length of the flow channels was 50 mm, and the depth-to-diameter ratio of the flow channels reached 125.

The composite process for preparing the profiled microchannel plate heat exchanger according to an embodiment of the present invention included a plurality of steps, and an embodiment of each step is as follows.

Embodiment I

Step S101: printing a metal substrate having an array of closed profile section hollow flow channels and a lug portion by selective laser melting.

Implementation: In a machine equipped with a selective laser melting apparatus, designed structural data of the profiled microchannel plate heat exchanger were input, the metal substrate was printed layer by layer using laser melting metal powder, and the lug portion was provided at a specific position.

Embodiment II

Step S102: cutting a multi-layer metal substrate with powder cleaned off into single-layer metal plates by wire cut electrical discharge machining, and leaving a grinding tolerance of 0.1-1 mm on upper and lower surfaces of the plates.

Implementation: the printed multi-layer metal substrate was cleaned to remove residual powder and cut into single-layer metal plates by wire cut electrical discharge machining to ensure that a certain grinding tolerance was left on the upper and lower surfaces for subsequent grinding.

Embodiment III

Step S103: connecting the single-layer plates resulting from the cutting to a precision grinding machine through a countersunk hole of the lug portion and bolts for grinding to ensure that the upper and lower surfaces of the single-layer plates resulting from the cutting were ground to smooth and flat surfaces with an accurate thickness after the cutting.

Implementation: the single-layer metal plates resulting from the cutting were placed in the countersunk hole of the lug portion and fixed by bolts, and then placed on a precision grinding machine for grinding to ensure that the upper and lower surfaces of the plates were smooth and flat and reached the accurate thickness required by design.

Embodiment IV

Step S104: making large aspect ratio section flow channels by cutting on the single-layer metal substrate plates using array line electrode wires by micro electrical discharge machining.

Implementation: By micro electrical discharge machine, cutting was carried out on the surfaces of the single-layer metal plates using the array line electrode wires to form profiled microchannel structures, ensuring that the channels had a large aspect ratio to improve heat transfer efficiency.

The above are four specific embodiments and implementations of the composite process for preparing the profiled microchannel plate heat exchanger. The whole process includes laser printing, electrical discharge machining, grinding, micro electrical discharge machining, cleaning, compaction welding and fast wire cutting, which together complete the preparation of the profiled microchannel plate heat exchanger.

The above description is merely specific implementation of the present invention, but the scope of protection of the present invention is not limited thereto, and any modifications, equivalent substitutions, improvements, etc. made by any person skilled in the art within the technical scope disclosed in the present invention within the spirit and principles of the present invention should be covered within the scope of protection of the present invention.

What is claimed is:

1. A method for preparing a profiled microchannel plate heat exchanger, comprising the following steps:
   Step S101, performing slicing on a three-dimensional (3D) digital model of the profiled microchannel plate heat exchanger, and melting raw material powder layer by layer with a laser beam according to information of slices obtained by layering to obtain a multi-layer metal substrate; the multi-layer metal substrate comprising an array of hollow flow channels having a closed profile section and a lug portion; wherein the multi-layer metal substrate is printed layer by layer in a direction vertical to a core straight tube segment to prevent slag hanging from blocking the microchannels;

Step S102, cleaning off powder from the multi-layer metal substrate obtained in step S101, and then cutting the multi-layer metal substrate into a plurality of single-layer metal plates, with a grinding tolerance of 0.1-1 mm left on upper and lower surfaces of each of the single-layer metal plates during cutting;

Step S103, fastening and connecting countersunk holes of the lug portions of the metal plates obtained in step S102 to a grinding machine by bolts to grind the upper and lower surfaces of the metal plates;

Step S104, making flow channels on the metal plates obtained in step S103 using array line electrode wires, with at least one of the flow channels having a large aspect ratio section and formed by cutting with the array line electrode wires; wherein the array line electrode wires are arranged at intervals, are X in number and are divided into Y groups, and the flow channels are made by X/Y downward pressings; and Step S105, removing a surface oxide layer and surface oil stains from the metal plate obtained in step S104, and cleaning and drying the metal plates; then sequentially compacting the metal plates layer by layer, fixing the plurality of the metal plates by the lug portions, then welding the plurality of the metal plates by vacuum diffusion welding, and finally cutting away the lug portions to obtain a profiled microchannel plate heat exchanger core.

2. The method for preparing the profiled microchannel plate heat exchanger according to claim 1, wherein, in step S101, metal powder with a particle size of 5-35 um is used as the raw material powder, and argon gas is used as a protective gas to heat up to 60° C.; and in step S102, high pressure air and high pressure deionized water are used to clean off the powder inside the hollow flow channels of the multi-layer metal substrate.

3. The method for preparing the profiled microchannel plate heat exchanger according to claim 1, wherein, a single-layer thickness of the metal plates obtained by grinding in step S103 is not less than 0.3 mm, and a minimum characteristic size of the closed profile of the flow channels machined in step S104 is not less than 0.1 mm.

4. The method for preparing the profiled microchannel plate heat exchanger according to claim 1, wherein, flow channels with any section, including profiled section flow channels, can be machined in step S104.

5. The method for preparing the profiled microchannel plate heat exchanger according to claim 1, wherein, the flow channels are machined in step S104, the flow channels of the same layer, and the flow channels between layers are isolated from each other.

6. The method for preparing the profiled microchannel plate heat exchanger according to claim 1, wherein, in step S101, layer-by-layer printing is performed by Selective Laser Melting (SLM) to obtain the multi-layer metal substrate; and the SLM method comprises: printing a metal substrate by a laser metal fusion technique; scanning with a laser beam over a layer of metal powder along a predetermined path to melt and solidify the metal powder to form a predetermined pattern; and repeating the layer-to-layer scanning to print out a metal substrate with high design freedom to obtain the flow channels with a large depth-to-diameter ratio and a large aspect ratio as heat exchanger channels.

7. The method for preparing the profiled microchannel plate heat exchanger according to claim 1, wherein, in step S102, the multi-layer metal substrate is cut into the plurality of single-layer metal plates by Wire cut Electrical Discharge Machining (WEDM).

8. The method for preparing the profiled microchannel plate heat exchanger according to claim 1, wherein, in step S103, the upper and lower surfaces of each of the metal plates are ground until the upper and lower surfaces of the metal plates are ground to smooth and flat surfaces with an accurate thickness.

9. The method for preparing the profiled microchannel plate heat exchanger according to claim 1, wherein, in step S104, a complex flow channel is manufactured on the metal plate obtained by grinding in step S103 by Micro Electrical Discharge Machining (micro-EDM).

10. The method for preparing the profiled microchannel plate heat exchanger according to claim 1, wherein, in step S105, the metal plates obtained in step S103 are cleaned with acetic acid to remove a surface oxidation layer, then soaked in absolute ethyl alcohol to remove surface oil stains, and finally cleaned and dried with deionized water and high pressure air; and the lug portions are cut away by High-Speed Wire cut Electrical Discharge Machining (WEDM-HS).

* * * * *